US008738406B1

(12) United States Patent
Hazzard

(10) Patent No.: US 8,738,406 B1
(45) Date of Patent: May 27, 2014

(54) LUMP SUM DISABILITY BENEFIT RIDER

(75) Inventor: Lawrence S. Hazzard, Pittsfield, MA (US)

(73) Assignee: Berkshire Life Insurance of America, Pittsfield, MA (US)

( * ) Notice: Subject to any disclaimer, the term of this patent is extended or adjusted under 35 U.S.C. 154(b) by 22 days.

(21) Appl. No.: 13/467,777

(22) Filed: May 9, 2012

Related U.S. Application Data

(60) Provisional application No. 61/485,387, filed on May 12, 2011.

(51) Int. Cl.
*G06Q 40/00* (2012.01)
(52) U.S. Cl.
USPC ............................................................ 705/4
(58) Field of Classification Search
None
See application file for complete search history.

(56) References Cited

U.S. PATENT DOCUMENTS

| | | | |
|---|---|---|---|
| 4,750,121 A | 6/1988 | Halley et al. | |
| 4,969,094 A | 11/1990 | Halley et al. | |
| 5,673,402 A | 9/1997 | Ryan et al. | |
| 7,113,913 B1 | 9/2006 | Davis et al. | |
| 7,231,362 B2 | 6/2007 | Wilce et al. | |
| 7,260,548 B1 | 8/2007 | Allsup | |
| 7,398,241 B2 | 7/2008 | Fay et al. | |
| 7,640,202 B2 | 12/2009 | Foti et al. | |
| 7,664,700 B1 | 2/2010 | Fisher | |
| 7,720,729 B2 | 5/2010 | Wilce et al. | |
| 7,765,116 B1 | 7/2010 | Allsup | |
| 7,801,748 B2 | 9/2010 | Bonissone et al. | |
| 7,848,978 B2 | 12/2010 | Imrey et al. | |
| 8,296,208 B2 * | 10/2012 | Roche et al. | 705/35 |
| 2002/0072936 A1 | 6/2002 | Newman | |
| 2002/0103677 A1 | 8/2002 | Sexton et al. | |
| 2002/0103679 A1 | 8/2002 | Burkhalter et al. | |
| 2004/0148202 A1 | 7/2004 | Siefe et al. | |
| 2004/0267579 A1 | 12/2004 | Markman | |
| 2006/0041455 A1 | 2/2006 | Dehais | |
| 2006/0155622 A1 | 7/2006 | Laux | |
| 2007/0021986 A1 | 1/2007 | Cheung et al. | |
| 2007/0214022 A1 | 9/2007 | Hagelman et al. | |
| 2008/0147447 A1 | 6/2008 | Roche et al. | |
| 2008/0167903 A1 | 7/2008 | Hall et al. | |
| 2008/0172260 A1 | 7/2008 | Thacker et al. | |
| 2008/0177580 A1 | 7/2008 | Gabriel | |
| 2008/0183636 A1 | 7/2008 | Walsh et al. | |
| 2009/0094070 A1 | 4/2009 | Harris et al. | |
| 2009/0112632 A1 * | 4/2009 | Belliveau et al. | 705/4 |
| 2009/0150189 A1 | 6/2009 | Barron et al. | |
| 2009/0204441 A1 | 8/2009 | Read et al. | |
| 2009/0276247 A1 | 11/2009 | Howell | |
| 2009/0276369 A1 | 11/2009 | Mabry et al. | |
| 2010/0030583 A1 | 2/2010 | Fievoli et al. | |
| 2010/0185548 A1 | 7/2010 | Wilce et al. | |
| 2010/0305976 A1 | 12/2010 | Fischer et al. | |

* cited by examiner

*Primary Examiner* — Jason M Borlinghaus
(74) *Attorney, Agent, or Firm* — McGuireWoods, LLP

(57) ABSTRACT

A system, a computer implemented method and a computer readable medium for providing a lump sum disability benefit to a loss payee is provided. Payment of the lump sum disability benefit is conditioned upon the fulfillment of two or more requirements and is paid upon the later of two predetermined events.

20 Claims, 3 Drawing Sheets

LUMP SUM DISABILITY BENEFIT RIDER

CROSS-REFERENCE TO RELATED APPLICATIONS

This application claims priority under 35 U.S.C. §119(e) to U.S. Provisional Patent Application No. 61/485,387, titled "LUMP SUM DISABILITY BENEFIT RIDER," and filed on May 12, 2011, the disclosure of which is expressly incorporated by reference herein in its entirety.

FIELD OF THE DISCLOSURE

The present disclosure relates to a system, a computer implemented method, and a computer readable medium for providing a lump sum disability benefit to a loss payee. Payment of the lump sum disability benefit is conditioned upon the fulfillment of two or more requirements and is paid upon the later of two predetermined events.

BACKGROUND OF THE DISCLOSURE

A number of insurance products are known in the insurance industry that provide a disability benefit to help replace lost income when one is too sick or injured to perform the duties of his or her occupation. The most feature-rich disability insurance policies provide benefits long term for disabilities that might continue until, for example, the insured reaches an age of 65, 67 or even 70. A more select group of policies provide benefits that extend beyond one's working years and into retirement. For example, Metropolitan Life Insurance Company, Berkshire Life Insurance Company of America and The Principal Financial Group each offer either a lifetime or extended total disability benefit that each provides benefits beyond the maximum benefit period for continuous, total disabilities. Additionally, Metropolitan Life Insurance Company, Berkshire Life Insurance Company of America, Massachusetts Mutual Life Insurance Company and The Principal Financial Group each offer disability insurance to help replace retirement contributions that one is unlikely to continue while disabled. While these known insurance products may satisfy the needs of certain customers, an unfulfilled need exists for an insurance product that provides additional disability insurance benefits beyond those provided by the "To Age 65" long-term disability benefit period products in a design that is more appealing to consumers.

The disclosure provides a system and a method for providing a novel insurance product to a customer, as well as a system and a method for determining and paying out an amount under the novel insurance product to a customer upon occurrence of a predetermined event.

SUMMARY OF THE DISCLOSURE

According to one non-limiting example of the disclosure, a system is provided that provides a lump sum disability benefit rider to a policy to which it is attached. The system is comprised of a server (or computer) that may be connected to a network, a database, and one or more end-user computers. The system is configured to generate both a policy and a rider, which may be provided to a customer. All provisions of the policy may apply to the rider and remain the same, except where the provisions are changed by the rider.

The policy may be amended by adding or changing certain definitions. For example, "contributing payments" may be defined to mean any total disability benefits and/or residual disability benefits paid under the policy at the later of the expiration date or the end of the benefit period if disabled. The "lump sum benefit amount" may be defined to mean the amount that will be paid under the rider. The "non-contributing payments" may be defined to mean any benefits paid under the capital sum benefit, occupational rehabilitation benefit, modification and access benefit policy provisions, any catastrophic disability benefit rider attached to the policy, or the like. The "qualifying amount" may be any predetermined amount, which may be shown on a schedule page of the policy.

According to an aspect of the disclosure, a lump sum benefit amount may be paid out to a loss payee if both of the following conditions are met: The policy and the rider are in force on the expiration date of the policy; and, the sum of the contributing payments is equal to or greater than the qualifying amount. The lump sum benefit amount may be paid out in a single payment to the loss payee at the later of the expiration date of the policy or the end of the benefit period if disabled. The lump sum benefit amount is equal to the sum of the contributing payments multiplied by a predetermined factor, such as, for example, 35%. Non-contributing payments will not be considered toward the qualifying amount or the calculation of the lump sum benefit amount.

A premium for the rider may be provided and shown on a schedule page of the policy. The rider may be non-renewable after the expiration date of the policy.

The lump sum disability benefit rider may be set to terminate when the first of the following events occurs: (1) the lump sum benefit amount has been paid; (2) the premium for this rider remains unpaid for more than a predetermined number of days (e.g., 31 days); the date of a customer's written request to terminate the rider; or the policy terminates.

Another aspect of the disclosure relates to a computer implemented method for providing a lump sum disability benefit to a loss payee comprising: (a) generating a disability insurance policy comprising a lump sum disability rider using a generating module, wherein the disability insurance policy provides insurance coverage for the loss payee upon the occurrence of one or more disabilities defined therein; (b) making a plurality of contributing payments to the loss payee upon the occurrence of the one or more disabilities; and (c) paying the lump sum disability benefit to the loss payee upon the later of: (i) an expiration date of the disability insurance policy, wherein the expiration date is defined in the disability insurance policy; and (ii) an end of a benefit period, wherein the benefit period is defined in the disability insurance policy, wherein paying the lump sum disability benefit to the loss payee is conditioned upon the fulfillment of two or more requirements independent of the occurrence of the one or more disabilities, and wherein the lump sum disability benefit is equal to a sum of the plurality of contributing payments multiplied by a predetermined factor (e.g., 35%).

The two or more requirements may include: (1) that both the disability insurance policy and the lump sum disability rider are in force on the expiration date of the disability insurance policy; and (2) that the sum of the plurality of contributing payments is greater than or equal to a qualifying amount that is defined in the disability insurance policy.

The contributing payments usually comprise payments made under a total disability benefit provision and a residual disability benefit provision of the disability insurance policy but exclude payments made under a capital sum benefit provision, an occupational rehabilitation benefit provision, a modification and access benefit provision, and a catastrophic disability benefit provision of the disability insurance policy.

The lump sum disability rider may terminate upon the first of the following events: (a) payment of the lump sum disability benefit; (b) non-payment of a premium for the lump sum disability rider for more than a predetermined number of days; (c) written request by a customer to terminate the lump sum disability rider; and (d) termination of the disability insurance policy.

Yet another aspect of the disclosure relates to a computer implemented method for providing a lump sum disability benefit to a loss payee comprising: (a) generating a disability insurance policy comprising a lump sum disability rider using a generating module, wherein the disability insurance policy provides insurance coverage for the loss payee upon the occurrence of one or more disabilities defined therein; (b) making a plurality of contributing payments to the loss payee upon the occurrence of the one or more disabilities; and (c) paying the lump sum disability benefit to the loss payee upon the later of two predetermined events, wherein paying the lump sum disability benefit to the loss payee is conditioned upon the fulfillment of two or more requirements.

The two or more requirements may include that: (a) the disability insurance policy and the lump sum disability rider be in force on the expiration date of the disability insurance policy, wherein the expiration date of the disability insurance policy is defined in the disability insurance policy; and (b) the sum of the plurality of contributing payments be greater than or equal to a qualifying amount, wherein the qualifying amount is defined in the disability insurance policy. The two or more requirements are usually not that one or more disabilities defined in the disability insurance policy occur.

The contributing payments may comprise payments made under a total disability benefit provision and a residual disability benefit provision of the disability insurance policy but exclude payments made under a capital sum benefit provision, an occupational rehabilitation benefit provision, a modification and access benefit provision, and a catastrophic disability benefit provision of the disability insurance policy.

The two predetermined events may comprise: (a) an expiration date of the disability insurance policy, wherein the expiration date is defined in the disability insurance policy; and (b) an end of a benefit period, wherein the benefit period is defined in the disability insurance policy.

The lump sum disability benefit may be equal to the sum of the plurality of contributing payments multiplied by a predetermined factor (e.g., 35%). Furthermore, the lump sum disability rider may terminate upon the first of the following events: (a) payment of the lump sum disability benefit; (b) non-payment of a premium for the lump sum disability rider for more than a predetermined number of days; (c) written request by a customer to terminate the lump sum disability rider; and (d) termination of the disability insurance policy.

Another aspect of the disclosure relates to a computer readable medium comprising a computer program for providing a lump sum disability benefit to a loss payee, the computer readable medium comprising program code sections, which when executed on a server, cause the server to: (a) determine whether a disability insurance policy and a lump sum disability benefit rider are in force on an expiration date of the disability insurance policy, wherein the expiration date is defined in the disability insurance policy; (b) determine a sum of a plurality of contributing payments paid to a loss payee under the disability insurance policy; (c) determine whether the sum of the plurality of contributing payments is greater than or equal to a qualifying amount, wherein the qualifying amount is defined in the disability insurance policy; and (d) generate and forward a lump sum disability benefit payment to the loss payee upon the later of two predetermined events if: (1) the disability insurance policy and the lump sum disability benefit rider are in force on the expiration date of the insurance policy; and (2) the sum of the plurality of the contributing payments is greater than or equal to the qualifying amount.

The contributing payments may comprise payments made under a total disability benefit provision and a residual disability benefit provision of the disability insurance policy but exclude payments made under a capital sum benefit provision, an occupational rehabilitation benefit provision, a modification and access benefit provision, and a catastrophic disability benefit provision of the disability insurance policy.

The two predetermined events may comprise: (a) the expiration date of the disability insurance policy; and (b) an end of a benefit period, wherein the benefit period is defined in the disability insurance policy.

The lump sum disability benefit payment may equal the sum of the contributing payments multiplied by a predetermined factor (e.g., 35%). Furthermore, the lump sum disability rider may terminate upon the first of the following events: (a) payment of the lump sum disability benefit; (b) non-payment of a premium for the lump sum disability rider for more than a predetermined number of days; (c) written request by a customer to terminate the lump sum disability rider; and (d) termination of the disability insurance policy.

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
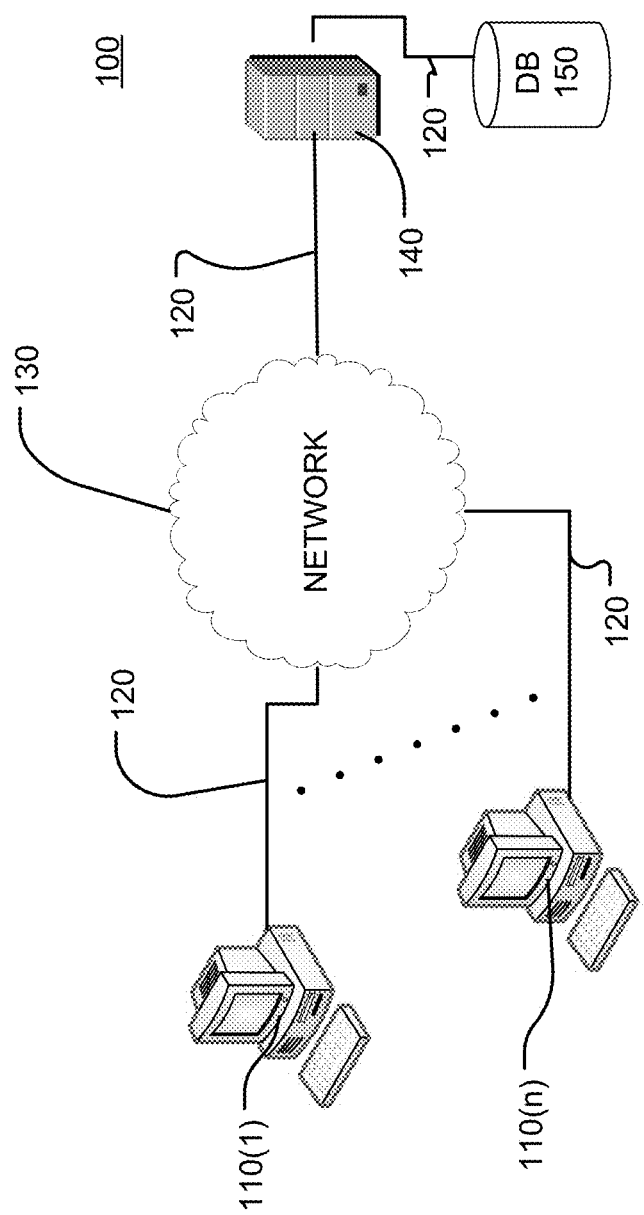
FIG. 1 shows an example of a system for generating a policy and a rider, and paying out a lump sum benefit amount under the policy and rider to a loss payee.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server", as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

A "network," as used, in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium.

The terms "including", "comprising" and variations thereof, as used in this disclosure, mean "including, but not limited to", unless expressly specified otherwise.

The terms "a", "an", and "the", as used in this disclosure, mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practicable. Further, some steps may be performed simultaneously.

When a single device or article is described herein, it will be readily apparent to one of ordinary skill in the relevant art that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a random access memory (RAM), a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

FIG. 1 shows an example of a system 100 for generating a policy and a rider, and paying out a lump sum benefit amount under the policy and rider to a loss payee. The loss payee may include, e.g., the insured individual, a beneficiary, a person identified in the rider and/or policy, a trust, an entity, or the like. The system 100 includes a server (or computer) 140 and a database 150. The server 140 and database 150 may be connected to each other and/or a network 130 via one or more communication links 120.

A plurality of end-user computers 110(1) to 110(n) may be coupled to the network 130 via communication links 120, where n is a positive integer greater than 1.

Figure 2:
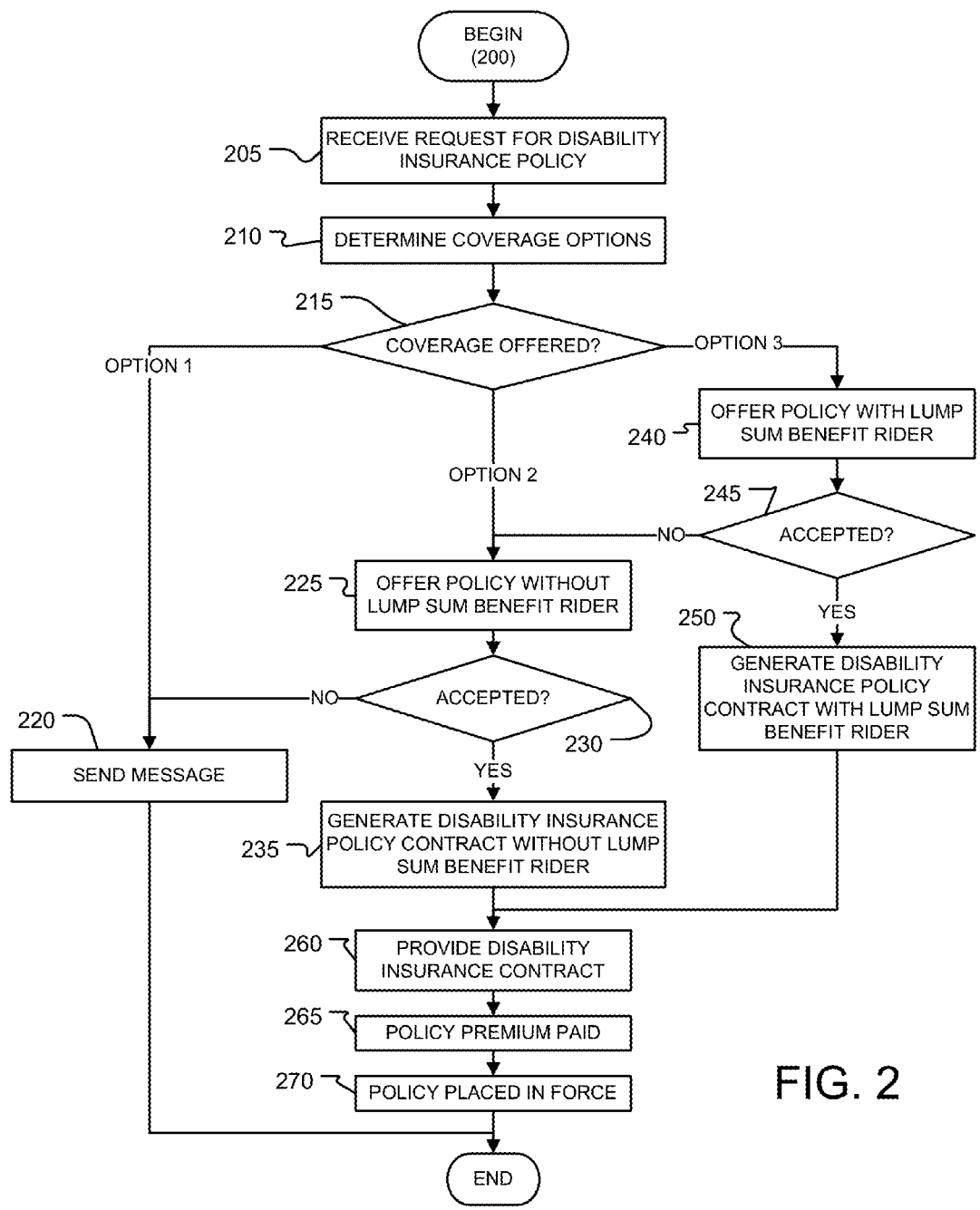
FIG. 2 shows an example of a process for offering and generating a lump sum disability benefit rider to a customer.

FIG. 2 shows an example of a process 200 for offering and generating a lump sum disability benefit rider to a customer. The process 200 may be carried out by, for example, the server 140. Initially, a request for a disability insurance policy, or another policy, may be received (Step 205). Based on the requested policy, one of three options may be determined, including an option not to offer any coverage (Option 1), an option to offer a policy without a lump sum disability rider (Option 2), and an option to offer a policy with a lump sum disability rider (Option 3) (Step 210). A determination may be made to offer one of the three options (Step 215).

If a determination is made not to offer any coverage (OPTION 1 at Step 215), then a message may be generated and sent to, e.g., the end-user computer 10, such as, e.g., notifying the end-user that a disability insurance policy is not available for the customer (Step 220).

If a determination is made to offer the disability insurance policy without a lump sum benefit rider (OPTION 2 at Step 215), then the disability insurance policy may be offered to the customer without a lump sum benefit rider (Step 225). If the customer accepts the disability insurance policy without the lump sum benefit rider (YES at Step 230), then a disability insurance policy contract may be generated for the customer (Step 235), which may include an underwriting process, and the contract may be provided to the customer (e.g., via the end-user computer 10) (Step 260). If the customer rejects the disability insurance policy (NO at Step 230), then a message may be generated and sent to, e.g., the end-user computer 10 (Step 220). The message may include, for example, an offer for another insurance product.

In a particular aspect of the disclosure, the customer may be given the choice of electing an elimination period. The elimination period may include a period beginning at the point of the disabling event during which a loss payee is not eligible to receive benefits even if an otherwise covered event (e.g., disability, illness, etc.) takes place. If the loss payee remains disabled at the end of the elimination period, the loss payee may become eligible to receive benefits.

If a determination is made to offer the disability insurance policy with a lump sum benefit rider (OPTION 3 at Step 215), then the disability insurance policy may be offered to the customer with a lump sum benefit rider (Step 240). If the customer accepts the disability insurance policy with the lump sum benefit rider (YES at Step 245), then a disability insurance policy contract and a lump sum benefit rider, including any schedules, may be generated for the customer (Step 250), which may include an underwriting process, and the contract and rider may be provided to the customer (e.g., via the end-user computer 10) (Step 260). If the customer rejects the offered policy and rider (NO at Step 245), then the policy without the rider may be offered to the customer (Step 225).

After the policy premium is received from the customer (Step 265), the policy (with or without the rider) may be placed into force (Step 270).

However, if the customer rejects the rider at step 240, then the policy contract alone, without the rider, may be provided to the customer at step 260.

The lump sum disability benefit rider may be, for example, an optional feature for Berkshire Life Insurance Company of America's individual disability insurance policy forms 1400, 1500 and 1600, or the like. The lump sum disability benefit rider may provide a lump sum disability benefit amount at the later of the policy expiration date or the end of the policy benefit period if disabled, equal to a predetermined factor, such as, for example, 35%, of all contributing payments that had been paid under the individual disability insurance policy. The contributing payments may include any total disability benefits and/or residual disability benefits paid under the policy until the later of the expiration date or the end of the benefit period if disabled. A separate "non-contributing payments" term may also be defined in the rider.

A loss payee may be eligible for the lump sum disability benefit when the policy and rider are in force on the expiration date of the policy, and the sum of the contributing payments is equal to or greater than the qualifying amount. The lump sum disability benefit rider may provide additional disability insurance benefits beyond those provided by the common "To Age 65" long-term disability benefit period insurance products. Unique factors of the present disclosure include: providing potential benefits at, for example, age 65 or 67 in a lump sum payment; and, calculating the lump sum disability benefit both from benefits that may have been paid for total disability as well as those benefits that may have been paid for residual disability and recovery.

According to an aspect of the disclosure, a computer readable medium is provided containing a computer program, which when executed on, for example, the server 140 (shown in FIG. 1), causes the process 200 in FIG. 2 to be carried out. The computer program may be tangibly embodied in the computer readable medium, comprising a code segment or code section for each of the steps 210 through 260.

Figure 3:
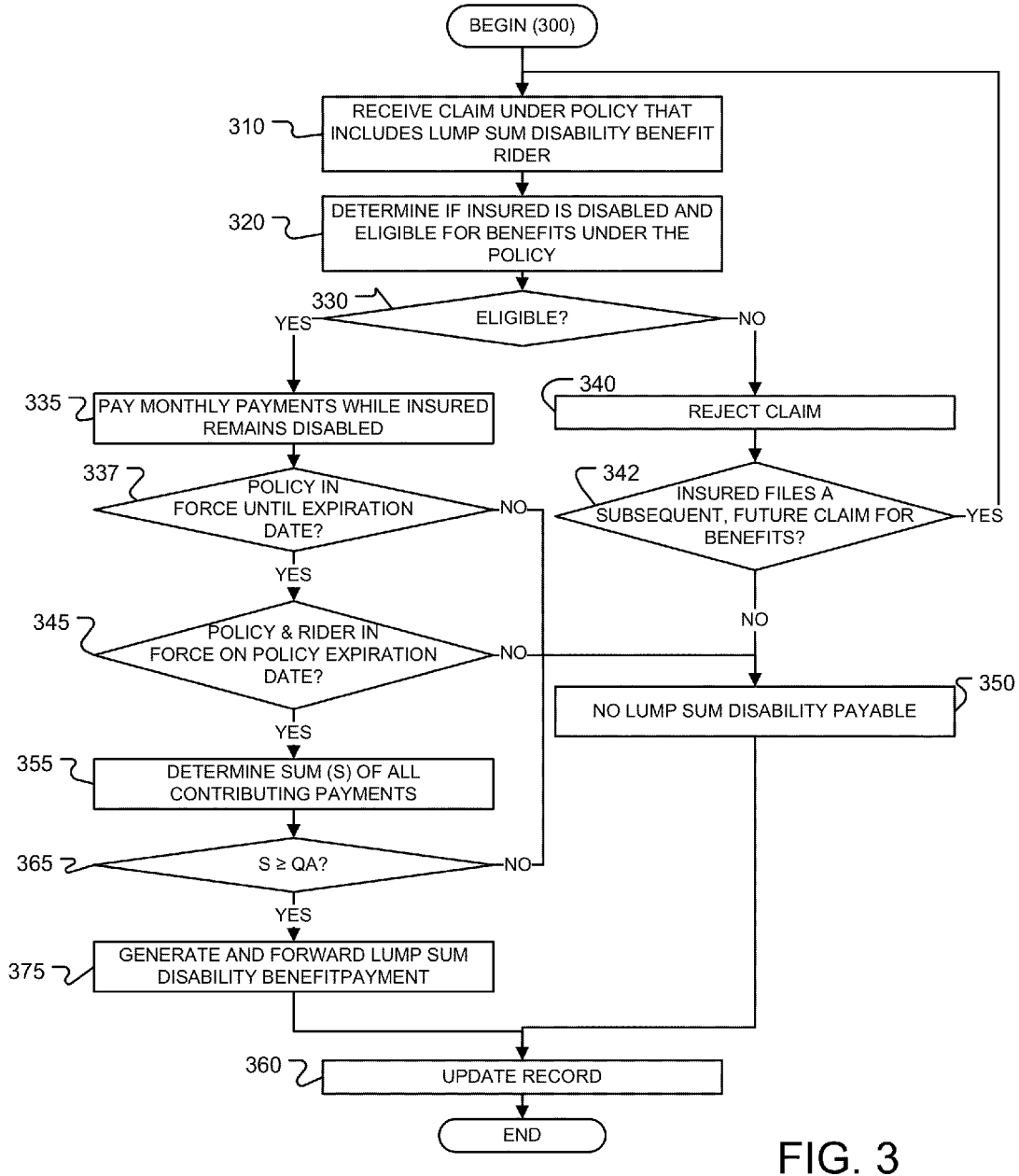
FIG. 3 shows an example of a process for determining and paying out a lump sum disability benefit amount to a loss payee.

FIG. 3 shows an example of a process 300 for determining and paying out a lump sum benefit amount to a loss payee (or insured if same). Initially, a claim is received from a claimant (or, e.g., an insured, a proxy, or the like) under a policy, such as, for example, a disability policy, that includes a lump sum disability benefit rider (Step 310). A determination is made whether the insured is disabled and eligible for benefits under the policy (Step 320). If the insured is determined to be disabled under the policy (YES at Step 330), then a determination may be made that the insured is eligible to receive monthly payments while the insured remains disabled (Step 335).

If the insured is determined to not be disabled under the policy (NO at Step 330), then the claim may be rejected (Step 340). If it is later determined that the claimant has filed a subsequent claim for benefits (YES at Step 342), then the claim may be received under the policy that includes the lump sum disability benefit rider (Step 310), otherwise (NO at Step 342) no lump sum disability is payable (Step 350). A record that is associated with the policy may be updated to indicate, for example, that the claim was rejected, the date of the rejection, the reason for the rejection, and the like (Step 360).

After a determination is made that the insured is eligible to receive monthly payments while he or she remains disabled (Step 335), a determination may be made as to whether the policy is in force until the expiration date (Step 337). If the policy is in force until the expiration date (YES at Step 337), then a determination may be made whether the policy and rider are in force (Step 345), otherwise (NO at Step 337) no lump disability may be payable (Step 350). If both the policy and the rider are determined to be in force on the policy expiration date (YES at Step 345), then a sum (S) of all contributing payments is determined (Step 355). If both the policy and rider are determined not to be in force (NO at Step 345), then a decision is made that no lump sum disability benefit is payable (Step 350) and the record associated with the policy may be updated to indicate, for example, that the policy and/or rider are not in force, the date at which the policy and/or rider expired, and the like (Step 360).

After the sum (S) of all contributing payments is determined (Step 355), a determination may be made as to whether the sum (S) is greater than or equal to a qualifying amount (QA) under the lump sum disability benefit rider (Step 365). If the sum (S) is greater than or equal to the qualifying amount (QA) (YES at Step 365), then a lump sum disability benefit payment may be generated and forwarded to the loss payee (Step 375) and the record associated with the policy may be updated to indicate, for example, the amount of the payment, the date of the payment, the method used to forward the payment, the location to which the payment was sent, and the like (Step 360). The payment may be forwarded via, for example, an electronic deposit, a check in the mail, or the like.

According to an aspect of the disclosure, a computer readable medium is provided containing a computer program, which when executed on, for example, the server 140 (shown in FIG. 1), causes the process 300 in FIG. 3 to be carried out. The computer program may be tangibly embodied in the computer readable medium, comprising a code segment or code section for each of the steps in the process 300, including Steps 310 through 375.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed is:

1. A computer implemented method for providing a lump sum disability benefit to a loss payee, the computer implemented method comprising:
    generating, on a computer, a disability insurance policy that provides insurance coverage for the loss payee upon the occurrence of one or more disabilities defined therein; and wherein the disability insurance policy further defines an expiration date for the insurance policy, a date upon which benefits end under the insurance policy and a qualifying amount;
    determining, by the computer, an occurrence of one or more disabilities defined in the disability insurance policy;
    making a plurality of contributing payments to the loss payee upon the occurrence of one or more disabilities;
    determining, by the computer, that two or more requirements separate from the occurrence of the one or more disabilities, have been satisfied;
    wherein one of the two or more requirements is the sum of the plurality of contributing payments being greater than or equal to the qualifying amount;
    calculating, by the computer, the lump sum disability benefit equal to a sum of the plurality of contributing payments multiplied by a predetermined factor;
    producing, by the computer, a lump sum disability benefit to the loss payee upon the later of the expiration date of the policy or the date upon which benefits end under the insurance policy.

2. The method according to claim 1, wherein one of the two or more requirements comprise: both the disability insurance policy and a lump sum disability rider being in force on the expiration date of the disability insurance policy.

3. The method according to claim 1, wherein the contributing payments comprise payments made under a total disability benefit provision and a residual disability benefit provision of the disability insurance policy.

4. The method according to claim 3, wherein the contributing payments exclude any payments made under a capital sum benefit provision, an occupational rehabilitation benefit provision, and a catastrophic disability benefit provision of the disability insurance policy.

5. The method according to claim 1, wherein the predetermined factor is 35%.

6. The method according to claim 1, wherein the disability insurance policy comprises a lump sum disability rider and the lump sum disability rider terminates upon the first of the following events:
    payment of the lump sum disability benefit;
    non-payment of a premium for the lump sum disability rider for more than a predetermined number of days;
    written request by a customer to terminate the lump sum disability rider; and
    termination of the disability insurance policy.

7. A computer implemented method for providing a lump sum disability benefit to a loss payee, the computer implemented method comprising:
    generating, on a computer, a disability insurance policy comprising a lump sum disability rider that provides insurance coverage for the loss payee upon the occurrence of one or more disabilities defined therein; and wherein the disability insurance policy further defines a qualifying amount;
    determining, by the computer, an occurrence of one or more disabilities defined in the disability insurance policy;
    making a plurality of contributing payments to the loss payee upon the occurrence of one or more disabilities;
    determining, by the computer, that two or more requirements separate from the occurrence of the one or more disabilities, have been satisfied;
    wherein one of the two or more requirements is the sum of the plurality of contributing payments being greater than or equal to the qualifying amount; and
    producing, by the computer, a lump sum disability benefit payment to the loss payee upon the later of two predetermined events.

8. The method according to claim 7, wherein the two or more requirements do not include the occurrence of the one or more disabilities defined in the disability insurance policy.

9. The method according to claim 7, wherein one of the two or more requirements comprise: both the disability insurance policy and a lump sum disability rider being in force on the expiration date of the disability insurance policy.

10. The method according to claim 7, wherein the contributing payments comprise payments made under a total disability benefit provision and a residual disability benefit provision of the disability insurance policy.

11. The method according to claim 10, wherein the contributing payment excludes any payments made under a capital sum benefit provision, an occupational rehabilitation benefit provision, and a catastrophic disability benefit provision of the disability insurance policy.

12. The method according to claim 7, wherein the two predetermined events include:
   an expiration date of the disability insurance policy, wherein the expiration date is defined in the disability insurance policy; and
   an end of a benefit period, wherein the benefit period is defined in the disability insurance policy.

13. The method according to claim 7, wherein the lump sum disability benefit is equal to the sum of the plurality of contributing payments multiplied by a predetermined factor.

14. The method according to claim 1, wherein the predetermined factor is 35%.

15. A non-transitory computer readable medium comprising a computer program for providing a lump sum disability benefit to a loss payee, which when executed on a computer, cause the computer to:
   determine that a disability insurance policy and a lump sum disability benefit rider are in force on an expiration date of the disability insurance policy, wherein the expiration date is defined in the disability insurance policy;
   determine a sum of a plurality of contributing payments paid to a loss payee under the disability insurance policy;
   determine that the sum of the plurality of contributing payments is greater than or equal to a qualifying amount, wherein the qualifying amount is defined in the disability insurance policy; and
   generate and forward a lump sum disability benefit payment to the loss payee upon the later of two predetermined events.

16. The computer readable medium according to claim 15, wherein the two predetermined events include:
   the expiration date of the disability insurance policy; and
   an end of a benefit period, wherein the benefit period is defined in the disability insurance policy.

17. The computer readable medium according to claim 15, wherein the lump sum disability benefit payment is equal to the sum of the contributing payments multiplied by a predetermined factor.

18. The computer readable medium according to claim 17, wherein the predetermined factor is about 35%.

19. The computer readable medium according to claim 15, wherein the contributing payments comprise payments made under a total disability benefit provision and a residual disability benefit provision of the disability insurance policy.

20. The method according to claim 19, wherein the contributing payments exclude any payments made under a capital sum benefit provision, an occupational rehabilitation benefit provision, and a catastrophic disability benefit provision of the disability insurance policy.

* * * * *